May 1, 1951     R. A. VINSON     2,551,402
APPARATUS FOR ASSEMBLING AND SEALING GLASS AND METAL PARTS
Filed Sept. 26, 1946     2 Sheets-Sheet 1
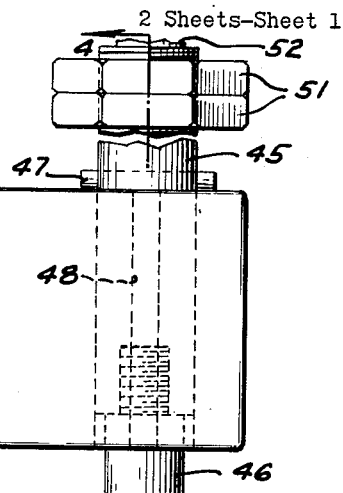
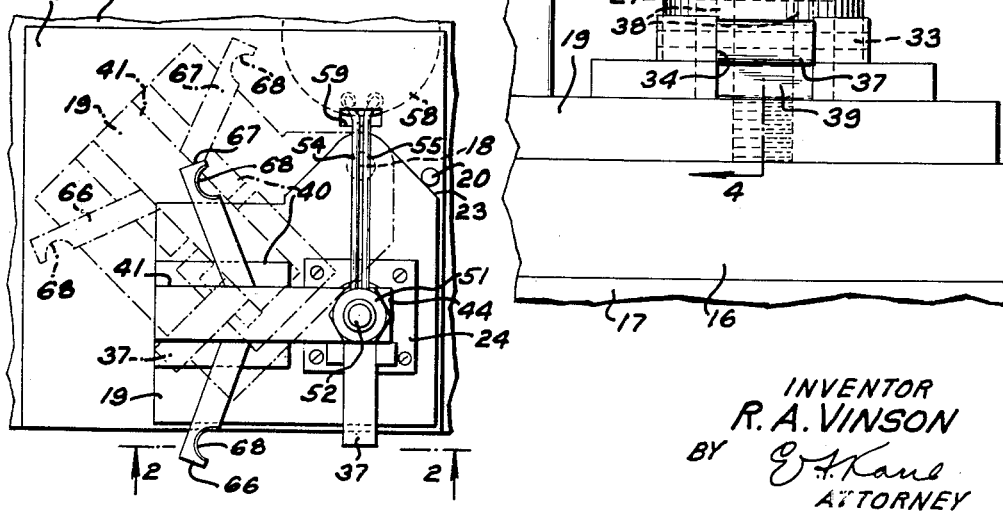
INVENTOR
R. A. VINSON
BY
ATTORNEY

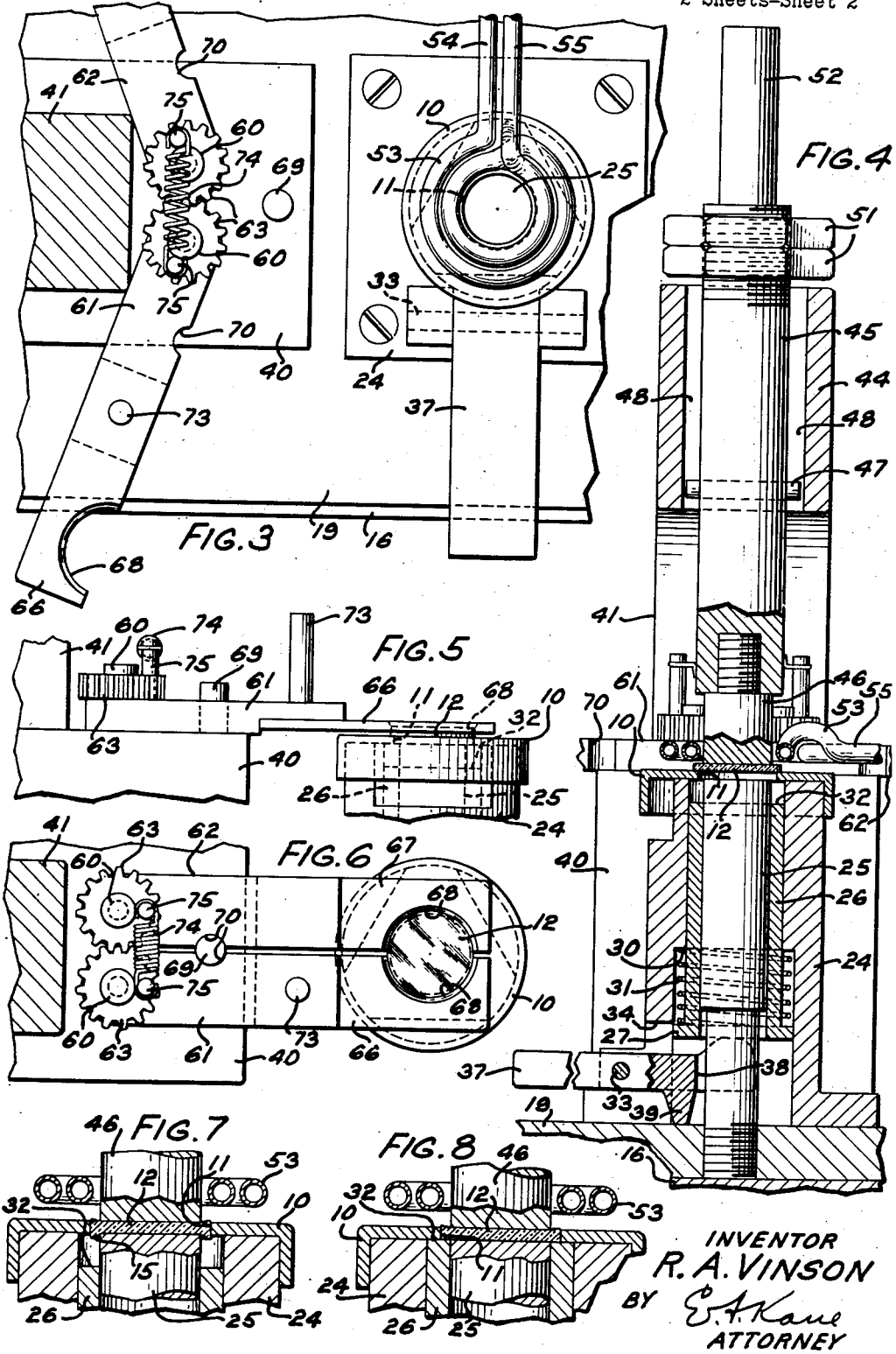

Patented May 1, 1951

2,551,402

UNITED STATES PATENT OFFICE 2,551,402

APPARATUS FOR ASSEMBLING AND SEALING GLASS AND METAL PARTS

Ralph A. Vinson, Western Springs, Ill., assignor to Western Electric Company, Incorporated, New York, N. Y., a corporation of New York Application September 26, 1946, Serial No. 699,486

3 Claims. (Cl. 49—1)

This invention relates to apparatus for assembling and sealing glass and metal parts together and more particularly to apparatus for aligning and sealing glass windows in apertured cup-shaped metal parts of vacuum tubes.

An object of this invention is the provision of an apparatus for accurately and expeditiously aligning and sealing glass and metal parts.

In accordance with the above object, this invention contemplates, in one embodiment thereof, an apparatus by means of which an apertured "Kovar" metal cup for a vacuum tube is mounted in an inverted position upon a support carried by a pivotal table, which is then rocked to carry the cup into the field of a stationary high frequency coil whereat the cup is heated sufficiently to oxidize it. Thereafter, the table is rocked back to its initial position and an optical glass window is placed on the cup and then aligned with the aperture therein which is to receive it by means of a pair of levers carried on the table and geared one to another and normally spring-urged together and having window embracing ends effective to accurately align the window with the receiving aperture. Upon the withdrawal of the aligning levers from the window, the table is rocked again to carry the assemblage into the field of the high frequency coil whereat the peripheral edges of the glass window are rendered plastic by the heat transmitted to it from the heated metal cup, whereupon a plunger coaxially aligned with and enterable in the coil is lowered to engage and push the window into the aperture of the cup and against an end surface of an aligned abutment of circular cross-section lying in the plane of the support surface carrying the cup. A lever actuated reciprocable sleeve-like anvil slidable upon the periphery of the abutment is then raised to engage and iron out any depending molten glass adjacent the peripery of the window below the plane of the end surface of the abutment and the lower surface of the window.

Other objects and advantages of the invention will be apparent from the following detailed description taken in conjunction with the accompanying drawings, in which Fig. 1 is a fragmentary somewhat diagrammatic plan view of the apparatus of this invention showing the pivotal table in operative and loading positions in full line and broken lines, respectively;

Fig. 2 is an enlarged fragmentary elevational view taken on the line 2—2 of Fig. 1, the parts of the apparatus being shown in position for heating a metal cup;

Fig. 3 is a fragmentary plan sectional view taken on the line 3—3 of Fig. 2;

Fig. 4 is a fragmentary vertical sectional view taken on the line 4—4 of Fig. 2, the parts of the apparatus being shown in position during the sealing of the glass window to the metal cup;

Fig. 5 is a fragmentary elevational view of the glass window aligning mechanism shown in its operative position;

Fig. 6 is a plan view thereof;

Fig. 7 is an enlarged fragmentary vertical sectional view showing the relation of the parts upon the insertion of the glass window in the aperture of the metal cup; and Fig. 8 is a view similar to Fig. 7 showing the position of the reciprocable anvil upon completion of the sealing of the glass window in the aperture of the metal cup.

Although not limited thereto, apparatus embodying the features of the invention may be employed to advantage for assembling, aligning and sealing an optical glass window in an aperture of a "Kovar" metal cup forming an assemblage used in a vacuum tube. As shown in Figs. 7 and 8, such an assemblage may comprise an inverted cup-like metal member 10 having a central aperture 11 in its upper circular wall into which is inserted an optical glass window 12, the window 12, as shown in Fig. 4, being suitably larger in diameter than that of the aperture and in a plastic molten condition around its peripheral edge when inserted into the aperture of the cup, which is heated at the time. In the final finishing operation on the assemblage, any excess of molten glass adjacent the lower peripheral edge of the window, as indicated at 15 in Fig. 7, is ironed out and pressed into the body of the window, as shown in Fig. 8, and the window firmly locked in the aperture as shown. Any excess of glass at the upper peripheral edge of the window, if within an allowable amount, is not critical and may be left thereat.

Referring now to the drawings in detail and particularly to Figs. 1 and 2, the apparatus comprises a base plate 16, which may be fixed to a bench top or other support 17. Pivoted, as indicated at 18 (Fig. 1), to the plate 16 and slidable thereon is an irregular shaped table 19. In the full line or operative position of the table 19, as shown in Fig. 1, a stop pin 20, fixed to the base plate 16 and engaging a vertical edge face 23 of the table, serves to accurately align the table in such position when it is rocked counter-clockwise about its pivot 18 from its loading position, shown in broken lines.

To the table 19 is attached a flanged sleeve 24 having a diameter at its upper end for freely receiving the inner diameter of the inverted cup-like member 10, which rests on the upper end face of the sleeve (Fig. 4). Fixed to the table 19, in coaxial alignment with the sleeve 24, is a shouldered rod or abutment member 25 having its upper end face disposed in the plane of the upper end face of the sleeve. Arranged between the outer and inner peripheries of the abutment member 25 and sleeve 24, respectively, and freely slidable thereon is a reciprocable sleeve 26, which is flanged at its lower end at 27 to fit in an enlarged inner diameter of the sleeve 24, which enlargement provides an annular shouldered surface 30. Surrounding the sleeve 26, with its opposite ends engaging the surface 30 and the opposed annular surface of the flange 27, is a coiled compression spring 31, which normally acts to press the sleeve 26 downward to space its upper annular anvil-like end face 32 from the plane of the upper end face of the fixed sleeve 24 and abutment member 25, as shown in Figs. 4 and 7. Pivoted, as indicated at 33 (Figs. 2 and 4), to the lower end of the sleeve 24 within a slot 34 thereof is an actuating lever 37 for the spring-pressed sleeve 26, the inner end of the lever 37 being bifurcated, as indicated at 38, and its furcations engaging the flange 27 of the sleeve. In the normal positions of the sleeve 26 and the lever 37 (Fig. 4), a stop member 39 on the lever engages the upper surface of the table 19. It will be apparent that upon rocking the lever 37 in a counterclockwise direction about its pivot 33, the sleeve 26 may be raised to carry its upper annular anvil-like end face 32 into the plane of the upper end face of the sleeve 24 and the abutment member 25 (Fig. 8).

To the left of the sleeve 24, as viewed in Fig. 2, and carried by the table 19, is a platform 40, from which rises a standard 41 having a horizontal arm 44 extending over the sleeve 24, in which arm is reciprocably carried a vertical plunger 45 coaxially aligned with the sleeve 24 and the cup 10 supported thereon. Upon the lower end of the plunger 45 is carried a work-engaging head 46 of reduced diameter for engaging the glass window 12 when the plunger is lowered, as shown in Figs. 4, 7 and 8. As illustrated in Fig. 2, the plunger 45 is retained in its upper inoperative position by means of a transverse pin 47 carried by the plunger resting upon the upper surface of the arm 44. When the plunger 45 is lowered from the position thereof shown in Fig. 2, in the operation of the apparatus, it is rotated to align the opposite ends of the pin 47 with diametrically opposed slots 48 formed in the arm and then lowered thereinto (Fig. 4). A pair of stop nuts 51 threaded onto the plunger 45 serve to limit the downward movement of the plunger when no work is in position thereunder. A handle portion 52 on the plunger 45 provides means whereby an operator may grasp and rotate the plunger and to raise it and lower it and to control the pressure thereof upon the work.

Arranged above and coaxially aligned with the sleeve 24, when the table 19 is in its operative position (Figs. 1, 2 and 4), is a stationary high frequency induction heated coil 53 comprising two concentrically disposed turns of copper tubing lying substantially in a common plane through which water is circulated for cooling purposes in a suitable manner (not shown). The coil 53 is electrically connected, by means of a pair of terminal portions 54 and 55, to a suitable electrical transformer 58 shown fragmentarily in broken outline in Fig. 1 and disposed below the bench top 17, the terminal portions extending upwardly through an aperture 59 in the bench top 17 and base plate 16 and then horizontally to the coil 53. Thus, the coil 53 is fixedly supported in the described position by means of the terminal portions 54 and 55. The hollow of the inner turn of the coil 53 is of such dimensions that the plunger head 46 may freely enter thereinto, as shown in Figs. 4, 7 and 8, when the plunger 45 is lowered into its operative position.

Pivoted upon the upper surface of the platform 40 at 60—60 are levers 61 and 62, each having fixed thereto a gear 63, which surrounds and is coaxial with its pivot 60, the gears being constantly in mesh. The pivots 60—60 are disposed equal distances at each side of an imaginary line extending perpendicular to the vertical axes of the sleeves 24 and 26 and the abutment member 25. Attached to the levers 61 and 62 at their outer ends are fingers 66 and 67, respectively, having arcuate formations 68 in their opposed edge faces at their free ends (Fig. 3). The fingers 66 and 67, in the operation of the levers 61 and 62 are effective to accurately center the glass window 12 with respect to the aperture 11 of the metal cup-like member 12 during the assembling of these parts previous to their sealing.

Adjacent the pivots 60—60 and arranged on the imaginary line extending between the pivots and perpendicularly to the vertical axes of the sleeves 24 and 26 and the abutment member 25 is a stop or locating pin 69, which is fixed to the upper face of the platform 40. When the levers 61 and 62 are operated to the positions shown in Figs. 5 and 6, arcuate formations 70 formed in the opposed edge faces of the fingers 66 and 67, abut the locating pin 69 and thus serve to position the arcuate formations 68 in the fingers 66 and 67 in accurate alignment about the vertical axes of the sleeves 24 and 26 and the abutment member 25. Attached to the lever 61 is a pin or handle 73, whereby it may be rocked about its pivot 60 and through the intermeshing gears 63 on the levers 61 and 62, the attached fingers 66 and 67 will be rocked simultaneously through the same arcuate distance. A contractile spring 74, having its opposite ends attached to the gears 63, as indicated at 75, serves to normally urge the levers and fingers toward each other into their operative positions (Figs. 5 and 6) and upon movement thereof, by means of the handle 73 to their inoperative positions (Fig. 3), the spring, in moving to the left of the pivots 60—60, serves to maintain the levers and fingers in their latter positions.

In the operation of the apparatus and assuming that the table 19 is in the position shown in broken outline in Fig. 1 and the plunger 45 is in its upper position (Fig. 4), an inverted cup-like metal member 10 is slipped onto the upper end of the sleeve 24 to the position shown in Figs. 2, 4, 7 and 8. Thereafter, the table 19 is rocked counterclockwise about its pivot 18 to engage its edge face 23 with the stop pin 20, in which position the cup-like member 10 will be coaxially aligned with the plunger 45 (Fig. 2) and suitably spaced below the heated stationary high frequency heating coil 53, the circuit to which from the transformer 58 having been closed. In this position of the cup-like member 10, it is within the field of the coil 53 and is heated sufficiently to oxidize it. Thereafter, the table 19 is rocked clockwise about its pivot 18 to the broken outline position shown in Fig. 1, thus carrying the heated cup-like member 10 out of the field of the coil 53.

An optical glass window 12 (Fig. 4) is then mounted on the cup-like member 10 and the window is then accurately concentrically located relative to the aperture 11 of the cup-like member by operating the locating fingers 66 and 67 in the manner previously described from their positions shown in Fig. 3 to that shown in Figs. 5 and 6. Following this positioning of the window 12, the fingers 66 and 67 are rocked back to their inoperative position (Fig. 3) and the table 19 is then rocked counterclockwise about its pivot 18 to carry the assembled cup-like member 10 and glass window 12 into the influence of the coil 53 (Fig. 4), in which position it is coaxially aligned with the plunger 45, the latter being at this time in its raised position. Just sufficient clearance is provided between the coil 53 and the window 12 to permit the window to freely move under the coil whereat the peripheral edge of the window will be heated by conduction from the heated cup-like member 10 to render it plastic. When this has occurred, the plunger 45 is lowered in the manner previously described to enter the head 46 carried thereby into the hollow of the coil 53 and into engagement with the glass window 12 (Fig. 4). The weight of the plunger 45 and attached parts will normally push the glass window 12 with its plastic peripheral edge into the aperture 11 of the cup-like member 10 to the position shown in Fig. 7, but the action of the plunger may be controlled by the operator by means of the handle 52. In this latter position of the window 12, its lower surface rests upon the upper end surface of the fixed abutment member 25, which lies in the plane of the upper end face of the fixed sleeve 24, upon which the cup-like member 10 rests. As hereinbefore described, the diameter of the glass window 12 is suitably larger than that of the aperture 11 in the cup-like member 10 so that an excess of molten glass will result as the window 12 is pressed into the aperture 11 and such excess of glass will generally depend from the lower surface of the window at its peripheral edge outside of the peripheral surface of the abutment member 25, as shown at 15 in Fig. 7. Immediately after the insertion of the window 12 in the aperture 11 of the member 10, the lever 37 is rocked counter-clockwise about its pivot 33, which serves to raise the spring-pressed sleeve 26 having the annular anvil-like upper face 32. The sleeve face 32 thus engages the depending plastic glass 15 at the peripheral lower edge of the window 12 and irons it out and presses it into the body of the window, the window and cup-like member now being sealed together as shown in Fig. 8.

What is claimed is:

1. An apparatus for assembling and sealing a glass element in an aperture of a metal part wherein the element is larger in diameter than the aperture comprising a base, a carrier movable on said base for supporting a metal part, heating means aligned with the carrier and spaced from the metal part supported thereon in one position of said carrier effective for heating the part, means carried on said carrier effective for accurately aligning a glass element mounted on the heated part with the aperture thereof, a plunger mounted on said carrier and aligned with said heating means in said one position of said carrier, and a handle on said plunger for actuating said plunger for movement into engagement with a glass element mounted on the heated metal part in alignment with the aperture thereof to press and seal the element into the aperture when said carrier is in said one position and the peripheral edge of the element has been rendered plastic by conduction from the heated metal part.

2. An apparatus for assembling and sealing a glass element in an aperture of a metal part wherein the element is larger in diameter than the aperture comprising a base, a carrier pivoted on said base having a hollow vertical extension for supporting upon an upper horizontal end face thereof a metal part, a high frequency heating means aligned with the carrier and spaced from the metal part supported thereon in one position of said carrier effective for heating the part, a plunger mounted on said carrier and aligned with said heating means in said one position of said carrier, an abutment member on said carrier coaxially aligned with and extending into said hollow extension, spaced therefrom and having an end face in the plane of said extension end face, the diameter of said abutment end face being less than that of the aperture in the metal part, a handle on said plunger for actuating said plunger for movement into engagement with a glass element mounted on the heated metal part in alignment with the aperture thereof to press the element thereinto and into engagement with the abutment end face and sealing it when said carrier has been moved to said one position, and the peripheral edge of the element has been rendered plastic by conduction from the heated metal part, a spring retracted sleeve within said hollow extension, surrounding said abutment member and having an anvil-like upper end face adapted, upon being advanced, to engage and iron out any excess of plastic glass depending after sealing from the lower peripheral edge of the glass element, and means for advancing said sleeve.

3. An apparatus for assembling and sealing a glass element in an aperture of a metal part wherein the element is larger in diameter than the aperture comprising a base, a carrier movable on said base having a hollow vertical extension for supporting upon an upper horizontal end face thereof a metal part, a high frequency heating means aligned with said carrier and spaced from the metal part supported thereon in one position of said carrier effective for heating the part, means carried on said carrier effective for accurately aligning a glass element mounted on the heated part with the aperture thereof, a plunger mounted on said carrier and aligned with said heating means in said one position of said carrier, an abutment member coaxially aligned with and extending into said hollow extension spaced therefrom and having an end face in the plane of said extension end face, the diameter of said abutment end face being less than that of the aperture in the metal part, a handle on said plunger for actuating said plunger for movement into engagement with a glass element to press and seal it into the aperture of the heated metal part and into engagement with said abutment end face and sealing it when said carrier has been moved to said one position and the peripheral edge of the element has been rendered plastic by conduction from the heated metal part, a sleeve within said hollow extension, surrounding said abutment member and having an anvil-like upper end face adapted upon being advanced to engage and iron out any excess of plastic glass depending after sealing from the lower peripheral edge of the glass element, and means for advancing said sleeve.

RALPH A. VINSON.

REFERENCES CITED

The following references are of record in the file of this patent:

UNITED STATES PATENTS

| Number | Name | Date |
|---|---|---|
| 195,994 | Edwards | Oct. 9, 1877 |
| 1,779,311 | Gates | Oct. 21, 1930 |
| 1,953,492 | May | Apr. 3, 1934 |
| 1,991,062 | Philpott | Feb. 12, 1935 |
| 2,125,316 | Ronci | Aug. 2, 1938 |
| 2,252,517 | Marshaus | Aug. 12, 1941 |
| 2,347,421 | Little | Apr. 25, 1944 |
| 2,415,867 | Cartun | Feb. 18, 1947 |
| 2,480,364 | Hansen et al. | Aug. 30, 1949 |